United States Patent
Gershtein et al.

(10) Patent No.: US 7,201,018 B2
(45) Date of Patent: *Apr. 10, 2007

(54) GENERATION AND DELIVERY SYSTEM FOR HIGH PRESSURE ULTRA HIGH PURITY PRODUCT

(75) Inventors: Vladimir Yliy Gershtein, Allentown, PA (US); Alexander Schwarz, Bethlehem, PA (US); Wayne Thomas McDermott, Fogelsville, PA (US); John Frederick Cirucci, Schnecksville, PA (US); John Christopher Ivankovits, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 435 days.

This patent is subject to a terminal disclaimer.

(21) Appl. No.: 10/753,315

(22) Filed: Jan. 9, 2004

(65) Prior Publication Data
US 2004/0154333 A1 Aug. 12, 2004

Related U.S. Application Data (63) Continuation-in-part of application No. 10/353,188, filed on Jan. 28, 2003, now Pat. No. 6,688,115.

(51) Int. Cl.
  *F25J 1/00* (2006.01)
  *F17C 5/00* (2006.01)
  *F17C 7/00* (2006.01)
(52) U.S. Cl. .................... 62/601; 62/54.2; 62/54.1
(58) Field of Classification Search ............ 62/54.2, 62/54.1, 601, 532
See application file for complete search history.

(56) References Cited

U.S. PATENT DOCUMENTS 3,667,242 A    6/1972   Kilburn
3,933,001 A *  1/1976   Muska .................. 62/54.1
4,695,302 A    9/1987   Tyree, Jr.
5,168,710 A   12/1992   Miyazaki
5,402,649 A    4/1995   Glasser
5,507,146 A    4/1996   Bjerklie
5,787,940 A    8/1998   Bonn et al.
6,260,361 B1   7/2001   Tyree, Jr.
6,327,872 B1  12/2001   Boyd et al.

(Continued)

FOREIGN PATENT DOCUMENTS

EP    0 523 568 B1    5/1996

(Continued)

*Primary Examiner*—Cheryl Tyler
*Assistant Examiner*—Michael J. Early
(74) *Attorney, Agent, or Firm*—Rosa Leen P. Morris-Oskanian; Joseph D. Rossi (57) ABSTRACT

The invention relates to a process and apparatus for delivering an ultra high purity fluid comprising at least one component to a point of use at a required pressure without mechanical pumping. In one embodiment, a high purity feed comprising at least one component in gaseous or liquid form is charged into a vessel and at least partially converted to a solid phase source. As the feed is converted to a solid phase source, additional feed may be added until the vessel is at least substantially filled with a solid phase source or slush. Once filled, the solid phase source or slush may be isochorically heated whereby the solid phase source is converted to a product at an elevated pressure.

32 Claims, 6 Drawing Sheets

U.S. PATENT DOCUMENTS

| | | |
|---|---|---|
| 6,381,967 B1 | 5/2002 | Craig |
| 6,405,541 B1 | 6/2002 | Brunnhofer |
| 6,688,115 B1 * | 2/2004 | Gershtein .................. 62/54.1 |
| 2001/0041210 A1 | 11/2001 | Kauffeld et al. |
| 2002/0174678 A1 * | 11/2002 | Wilding et al. ............... 62/602 |

FOREIGN PATENT DOCUMENTS

| | | |
|---|---|---|
| EP | 1 033 543 A2 | 9/2000 |
| JP | 6 281321 | 10/1994 |
| JP | 9 113128 | 5/1997 |
| WO | WO 00/33665 | 6/2000 |

\* cited by examiner

GENERATION AND DELIVERY SYSTEM FOR HIGH PRESSURE ULTRA HIGH PURITY PRODUCT

CROSS-REFERENCE TO RELATED APPLICATIONS

This application is a continuation-in-part of U.S. patent application Ser. No. 10/351,188, filed 28 Jan. 2003 now U.S. Pat. No. 6,688,115, the disclosure of which is incorporated herein by reference in its entirety.

BACKGROUND OF THE INVENTION

Highly pressurized, ultra high pure fluids, particularly carbon dioxide, are required for a variety of industrial processes. For example, some of the evolving applications in the electronic industry demand the use of supercritical carbon dioxide at high flow rates and high pressures. One of the methods for achieving high pressure carbon dioxide has been to pump liquid carbon dioxide to a required pressure. However, pumping liquid carbon dioxide to a high pressure can introduce impurities, such as particulates, hydrocarbons, halocarbons, etc., to the product stream.

Other applications, such as photo-resist removal, deposition, lithography, etc, may require an ultra high purity (UHP) process liquid such as carbon dioxide delivered to a point of use (POU) processing chamber at elevated pressures that range from 2,000 psig to 10,000 psig. The latter applications depend upon many factors such as, for example, specifics of an application, tool design, process philosophy, etc.

Processes for delivery of high pressure gases including carbon dioxide are known. Some of these processes may attempt to deliver UHP, high pressure vapor using, for example, a pump free system to elevate the vapor pressure while preserving gas purity. U.S. Pat. No. 6,023,933 discloses a process, which is capable of delivering UHP argon vapor at pressures up to 67,000 psig. In the '933 patent, a high purity gas is provided in a liquefied physical state, introduced to a vaporization vessel, and then heated in an isochoric vaporizer sufficiently to vaporize the liquefied gas. As the liquid is vaporized in the isochoric vaporizer, the pressure builds to pressures ranging from 10,000 to 67,000 psig. When the liquid is substantially vaporized, another unit is used for vapor delivery.

U.S. Pat. No. 6,327,872 discloses a process for delivering liquid carbon dioxide to a point of use at pressures of 750 to 1071 psig. The '872 patent acknowledges in the background the production of high-pressure liquid delivery systems up to about 68 bar by means of a pump and the problems associated therewith. The '872 patent teaches delivering liquid carbon dioxide to an accumulation vessel and then heating the liquid carbon dioxide contained therein thereby elevating the pressure. Using this method is possible to elevate liquid carbon dioxide from a bulk supply pressure of approximately 300 psig to a maximum of about 1071 psig. If isochoric heating continues above the critical point of about 31° C. and pressure of about 1071 psig, liquid carbon dioxide may be converted into a supercritical fluid. Further, the use of different fluid (other then purified carbon dioxide) can potentially lead to delivered product contamination.

There are also known processes and apparatuses for producing a multiphase slush. The majority of these processes and apparatuses, however, may not be suitable for UHP applications because they incorporate parts such as stirrers, augers, scrapers, pumps, etc. that are potential sources of product contamination. For example, U.S. Pat. Nos. 5,402,649 and 5,168,710 and European application EP0523568 each teach a $H_2$ slush producing method and apparatus that operates under vacuum conditions and incorporates one or more stirring devices. JP 09113128 teaches a method for generating and apparatus for producing $H_2$ slush using a surface scraper to separate solidified gas from a surface. JP 06281321 A describes a device that creates solid $H_2$ on a liquid surface using a coolant. The coolant has a temperature below the $H_2$ freezing point and a mixing device is used to create slush $H_2$.

Still other references describe slush creation by injecting of "freezing centers" into a liquid phase. For example, WO 0033665 describes producing a $CO_2$ slush by first injecting a $CO_2$ gas into an aqueous type solution. The solution solidifies due to temperature drop as a predetermined pressure is achieved. U.S. Pat. No. 6,405,541 and published U.S. patent application 20010041210 A1 describe solid particle injection into a liquefied gas to create slush.

EP 1033543 A2 describes a slush generation and collection process. The downside of the invention is that it uses an external cooling source to freeze liquid on a cooled surface, and that it is focused on cryogenic liquids such as oxygen, nitrogen, helium, and water.

U.S. Pat. No. 3,667,242 presents an apparatus for a $CO_2$ snow making process, but does not offer a slush creation process and a collector for holding slush.

SUMMARY OF INVENTION

A process and apparatus for the generation and delivery of a high purity fluid product (i.e., liquid, supercritical fluid, etc.), solid phase source, and/or a slush comprising at least one component such as, but not limited to, carbon dioxide, hydrogen, argon, nitrogen, oxygen, helium, and mixtures thereof, are disclosed herein. In one aspect of the present invention, there is provided a process and apparatus for delivering a high pressure and high purity fluid to a point of use at a required pressure without using pumps or similar mechanical devices that contain moving parts. The term "required pressure" as used herein relates to customer's operating pressure or the pressure required for a particular operation. In the process, a high purity feed stream in gaseous or in liquid form is charged to a vessel and at least partially solidified to provide a solid phase source. As the feed stream is converted to a solid phase source, additional feed stream may be added until the vessel is at least substantially filled with a solid phase or a slush, i.e., a combination of solid, liquid, and, in certain embodiments, vapor, of the at least one component. Once filled, the accumulated solid phase source may be isochorically heated, i.e., heated at constant volume, whereby initially the solid phase source is partially converted into a fluid product until an optimal pressure is reached. In certain embodiments wherein the vessel contains a vapor phase, the vapor phase can be converted into the fluid product during isochoric heating. In other embodiments wherein the fluid product is a liquid, the liquid product can then be withdrawn from the vessel at the required pressure at a rate at which the solid phase is converted into a liquid.

In another aspect of the present invention, there is provided a process for producing a solid phase source or a slush comprising at least one component comprising: introducing a feed stream into a vessel wherein the feed stream comprises at least one component and is at a first pressure that is above the triple point pressure of the at least one component; reducing the pressure of the feed stream within the vessel to a second pressure that is below the first pressure wherein at least a portion of the feed stream in the vessel is converted to a solid phase source and a vapor phase source; applying at least one energy source to at least a portion of the solid phase source in the vessel to convert the vapor phase source and at least a portion of the solid phase source to a liquid phase; and removing at least a portion of an effluent vapor from the vessel.

In yet another aspect of the present invention, there is provided a process for producing a solid phase source or a slush comprising at least one component comprising: introducing a feed stream into a vessel wherein the feed stream comprises at least one component and is at a first pressure that is above the triple point pressure of the at least one component; reducing the pressure of the feed stream within the vessel to a second pressure that is below the first pressure wherein at least a portion of the feed stream in the vessel is converted to a solid phase source; oscillating the pressure within the vessel to a pressure above and a pressure below the triple point pressure of the at least one component to provide the slush; and removing at least a portion of an effluent vapor within the vessel.

In a further aspect of the present invention, there is provided an apparatus for producing a fluid product stream at a required pressure comprising: a vessel for receiving a feed stream comprising at least one component; a chiller capable of converting at least a portion of the feed stream to the solid phase source in the vessel; a heater capable of converting a solid phase source contained within the vessel to the fluid product stream; and a flow network in fluid communication with the vessel that allows for charging of the feed stream and for discharging the fluid product stream therefrom wherein the flow network regulates the pressure contained within the vessel to one or more pressures at or above the required pressure.

In yet another aspect of the present invention, there is provided an apparatus for producing a fluid product stream at a required pressure comprising: a vessel for receiving a feed stream comprising at least one component wherein the feed stream is at a first pressure; a nozzle that is in fluid communication with the vessel that reduces a pressure of the feed stream to a second pressure that is below the first pressure and forms a solid phase source and an effluent within the vessel; at least one energy source that converts the solid phase source to a fluid product stream; and a flow network in fluid communication with the vessel that allows for charging of the feed stream and for discharging of an effluent vapor from the vessel therefrom wherein the flow network regulates the pressure contained within the vessel to one or more pressures at or above the required pressure.

In still another aspect of the present invention, there is provided an apparatus for producing a solid phase source or a slush comprising at least one component comprising: an inlet pipe for introducing a feed stream comprising at least one component wherein the feed stream is at a first pressure; an expansion nozzle that is in fluid communication with the inlet pipe wherein the pressure of the feed stream is reduced to a second pressure below the first pressure to convert at least a portion of the feed stream to a solid phase source and an effluent vapor; a vessel that is in fluid communication with the expansion nozzle having at least one selected from the solid phase source, the feed stream, the slush, a liquid phase product, a fluid, an effluent vapor, and mixtures thereof contained therein; at least one energy source proximal to and/or contained within the vessel wherein the at least one energy source converts at least a portion of the solid phase source to produce the slush; an outlet pipe in fluid communication with the vessel for the removal of at least a portion of an effluent vapor while maintaining a controlled pressure within the vessel; and a pressure control valve in fluid communication with the outlet pipe. The term "controlled pressure" as used herein could be a constant pressure or a pressure that can be oscillated above or below the triple point pressure of the at least one component.

These and other aspects of the present invention are provided in the Detailed Description of the Invention.

DETAILED DESCRIPTION OF THE INVENTION

Figure 1:
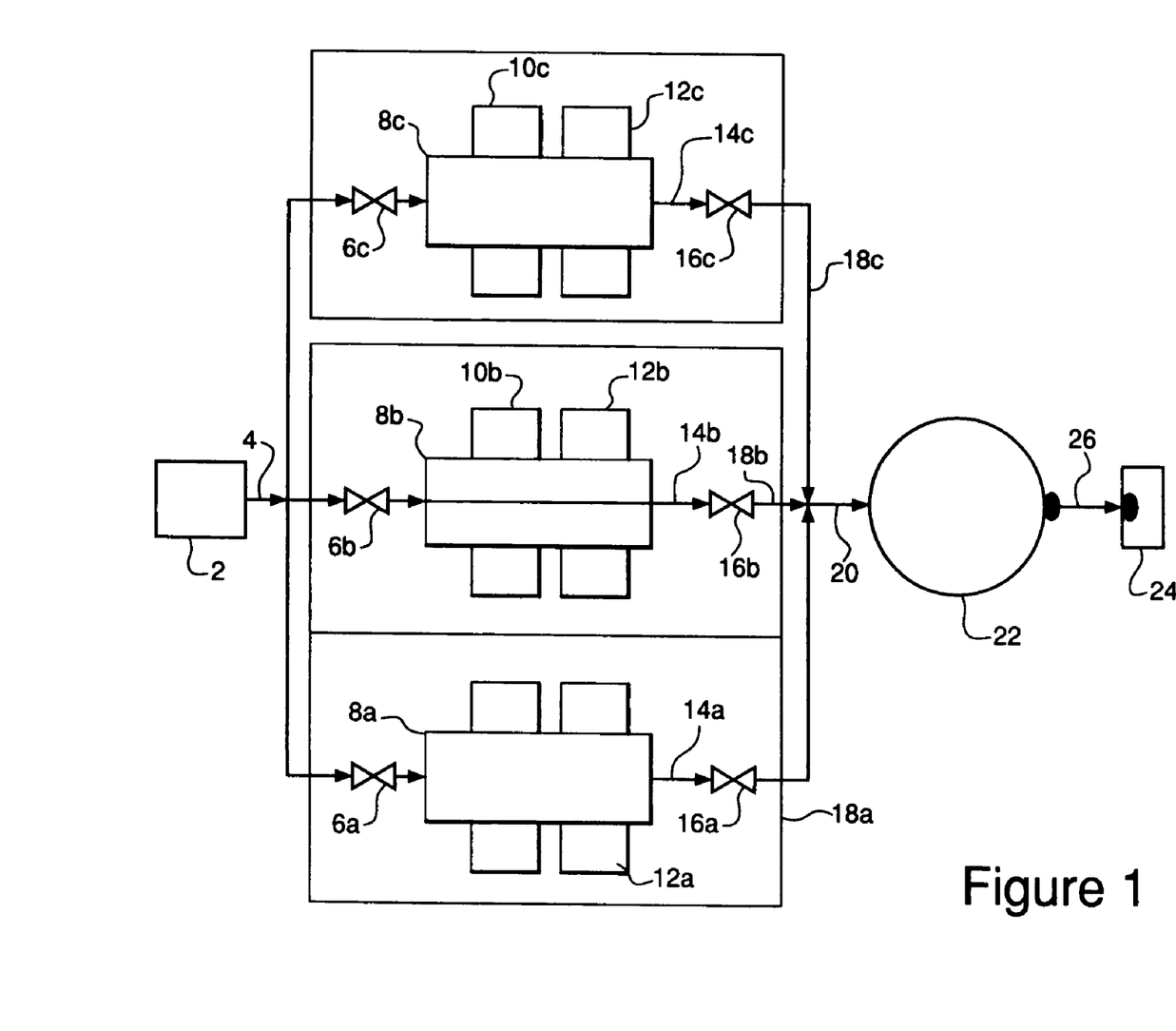
FIG. 1 provides an example of a three unit apparatus and process for the delivery of a fluid product, such as, for example, carbon dioxide, to a point of use at a required pressure that is achieved by the isochoric heating of a solid phase source or a slush source, such as carbon dioxide.

To facilitate an understanding of the apparatus and process, reference is made to the drawing of FIG. 1. Referring to FIG. 1, three units are shown to illustrate alternate delivery of a fluid product containing at least one component, such as, but not limited to, carbon dioxide, hydrogen, argon, nitrogen, oxygen, helium, and mixtures thereof, to a point of use. It is understood, however, that a plurality of units may be employed to alternate delivery of the fluid product without interruption of feed. Included in the three unit scheme shown in FIG. 1 is a flow network having valves associated with conduits to allow for an intermediate fluid stream to be alternately introduced to the respective vessels and to be alternately delivered from these vessels such that: prior to one of the vessels becoming significantly reduced of the solid phase source, a fluid stream may be withdrawn from another of the vessels having a solid phase source contained therein, thereby ensuring continual delivery of the pressurized fluid product.

FIG. 1 provides an illustration of an embodiment of the apparatus and system whereby a high pressure fluid product such as carbon dioxide is produced. In operation, a stream of gaseous or liquid feed containing carbon dioxide at initial delivery parameters, for example, liquid carbon dioxide at 300 psig at −5° F., is delivered to tank 2. The gaseous or liquid feed is preferably purified prior to introducing the feed into tank 2. The carbon dioxide feed then is removed from tank 2 by means of line 4, passed through valves 6a, 6b, or 6c and then to vessels 8a, 8b, or 8c respectively. Vessels 8a, 8b, or 8c are used for the generation of a slush or a solid phase source containing the at least one component. The term "slush" as used herein relates to a multiphase mixture of the at least one component that may contain solid, liquid, and vapor phases, preferably solid and liquid phases, of the at least one component. The carbon dioxide feed may be at least partially solidified in these vessels, i.e., vessels 8a, 8b, or 8c, with the help of optional chillers 10a, 10b, or 10c respectively. The function of the chillers is to simply lower the temperature of the carbon dioxide inside vessels 8a, 8b, or 8c to a temperature equal or below the carbon dioxide solidification point. In alternative embodiments such as when the carbon feed is delivered in liquid form, chillers 10a, 10b, or 10c may not be necessary and sudden expansion of the feed stream by reducing the pressure to a pressure that is below the pressure of the incoming feed stream can be used to form a solid-vapor or a liquid-vapor for solid phase source or slush generation in vessels 8a, 8b, or 8c. As solid carbon dioxide is formed, additional carbon dioxide feed from tank 2 is added to the respective vessels 8a, 8b, or 8c until that vessel is substantially, or preferably completely, filled with solid carbon dioxide or preferably with a solid-liquid mixture of carbon dioxide, i.e., slush. At that time, vessel 8a, 8b or 8c is isolated from tank 2 by closing appropriate valve 6a, 6b, or 6c.

To effect conversion of solid phase source carbon dioxide to a fluid product and pressurization thereof, the apparatus may incorporate at least one energy source such as, for example, heaters 12a, 12b, or 12c. These heaters, which are attached or built into the respective vessels 8a, 8b or 8c, are activated for heating and effecting the melting of the solid form of the carbon dioxide. In other embodiments, at least one energy source, besides or in addition to thermal energy (i.e., heaters), such as, for example, radiation, microwave, ultrasonic, laser or other sources may be used to covert at least portion of the solid phase source to a fluid product. Conversion of solid carbon dioxide to a fluid product may occur within isochoric conditions, i.e., maintaining a constant volume of the heated vessel. Isochoric heating of the high density substance, such as, for example, solid or slush carbon dioxide, provides the mechanism to increase the pressure of the resulting carbon dioxide fluid product to any pressure desired in the process and to deliver a lower density substance, such as for example, a fluid product such as liquid carbon dioxide, to the point of use (POU) at the required pressure. This pressure increase can be obtained without effecting a substantial change in the average slush temperature or internal temperature of carbon dioxide within the vessel. Operating over a narrow temperature range may allow for efficient use of the at least one energy source.

Fluid product can be withdrawn from vessels 8a, 8b and 8c via lines 14a, 14b and 14c and passed through pressure control valves 16a, 16b and 16c, respectively. Pressure control valves 16a, 16b and 16c maintain a controlled pressure within vessels 8a, 8b, or 8c. The controlled pressure could be a constant or fixed pressure or, alternatively, could be oscillated to a pressure above or below the triple point pressure of the at least one component to generate a slush. The fluid product can be transported via lines 18a, 18b and 18c respectively via line 20 and to an optional surge tank 22. The fluid product can be delivered to the point of use process chamber 24 via line 26 and/or from optional surge tank 22 at a required pressure, as for example, between 300 and 10,000 psig, and at a delivery temperature below the critical temperature, i.e., the highest temperature at which distinct vapor and liquid phases can coexist for the at least one component. In embodiments wherein the at least one component is carbon dioxide, the delivery temperature can be room temperature, e.g., 77° F., which is below the critical temperature of $CO_2$ or 87.9° F.

In certain embodiments, the fluid product may be liquid carbon dioxide. In these embodiments, since the density of the solid carbon dioxide is approximately 1.5 times greater then that of carbon dioxide in the liquid state, a significant volume of a carbon dioxide can be removed from vessel 8a, 8b or 8c at any preselected pressure. Liquid carbon dioxide product can be removed from each vessel at a rate, which is generally equal to the melting rate of the solid carbon dioxide within each vessel 8a, 8b or 8c. In this connection, the removal of liquid carbon dioxide product from each vessel may be immediately replaced with liquid carbon dioxide formed on conversion of the solid carbon dioxide to liquid carbon dioxide. By effecting withdrawal of liquid carbon dioxide at a rate substantially equal to the rate of formation of liquid carbon dioxide, the pressure inside vessels 8a, 8b or 8c can be maintained at a desired pressure, which is a pressure at or above the required pressure. Withdrawal of liquid carbon dioxide from the process is terminated when the solid phase carbon dioxide is substantially or completely converted to liquid.

In alternative embodiments, three phase slush, i.e. a mixture of solid, liquid, and vapor, can coexist inside vessels 8a, 8b, and 8c. The presence of the vapor phase contained therein may take more time and energy to reach relatively high pressures due to its compressibility. At higher pressures, there may be no vapor phase left because it converts into the liquid phase.

Several loops, as shown in the three unit system can be used to provide continuous flow of high pressure fluid to optional surge tank 22. Each loop typically will be operated with a cycle shifted in time relative to the neighboring loop. Conventional materials of construction, e.g., steel may be used, preferably stainless steel. Electro-polished stainless steel can be used if necessary.

Figure 2:
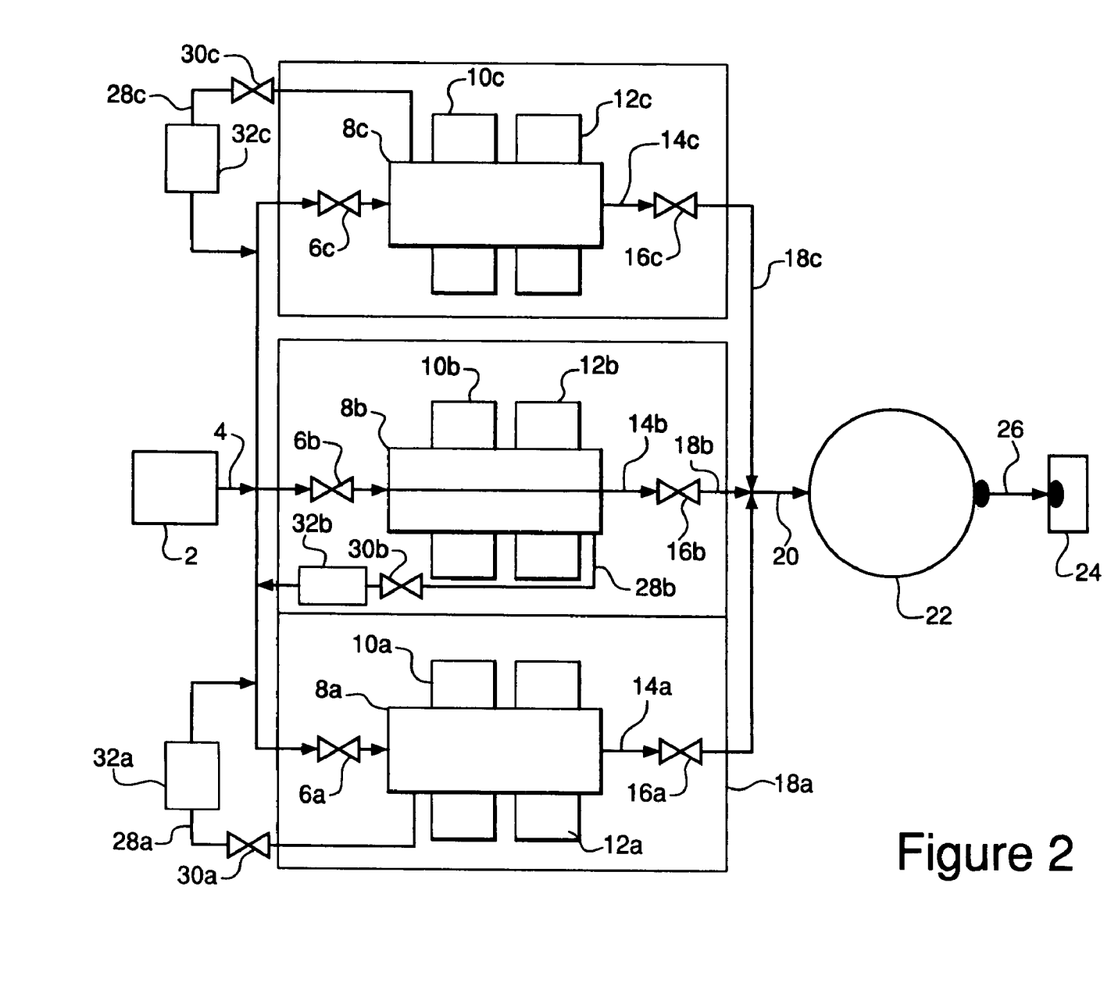
FIG. 2 provides an example of the apparatus of FIG. 1 further including a flow network for the removal, purification, and recycling of effluent vapor from vessels 8a, 8b, and 8c shown.

FIG. 2 provides an example of the apparatus of FIG. 1 further including a recycle flow network for the removal, purification, and recycling of effluent vapor contained within vessels 8a, 8b, and 8c shown. Vessels 8a, 8b, and 8c are in fluid communication with lines 28a, 28b, and 28c, respectively. Lines 28a, 28b, and 28c further include valves 30a, 30b, and 30c. However, in other embodiments, effluent vapor can be withdrawn, for example, through pressure control valves 16a, 16b, and 16b. In the embodiment shown in FIG. 2, effluent vapor from vessels 8a, 8b, and 8c is recycled and reintroduced into vessels 8a, 8b, and 8c through valves 6a, 6b, and 6c. In this embodiment, lines 28a, 28b, and 28c or the recycle flow network may also include at least one purifier 32a, 32b, and 32c, such as, but not limited to, a filter, a distiller, an adsorbent bed, a scrubber, or other device suitable for removing contaminants from the effluent vapor. In other embodiments, however, effluent vapor may be vented from vessels 8a, 8b, and 8c rather than recycled.

Figure 3:
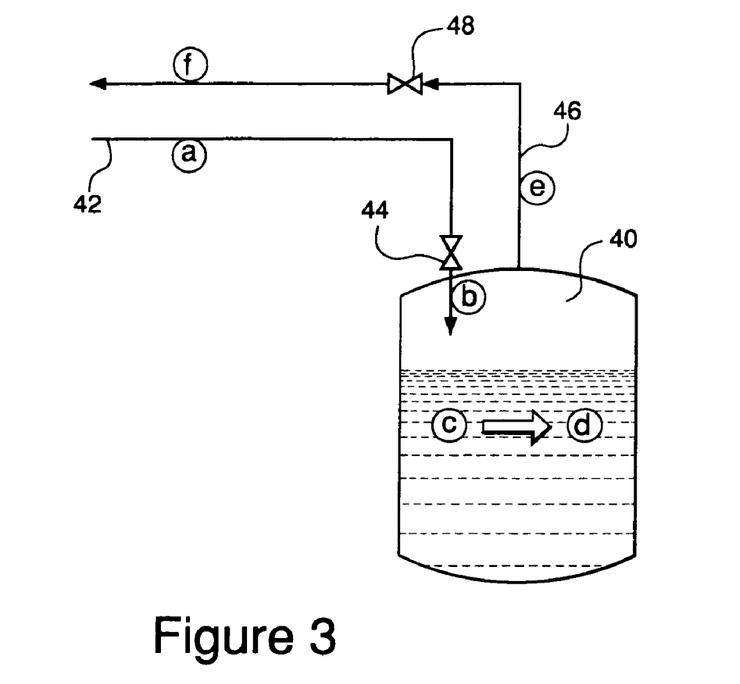
FIG. 3 provides an embodiment of the high-density product generation and collection apparatus.
Figure 4:
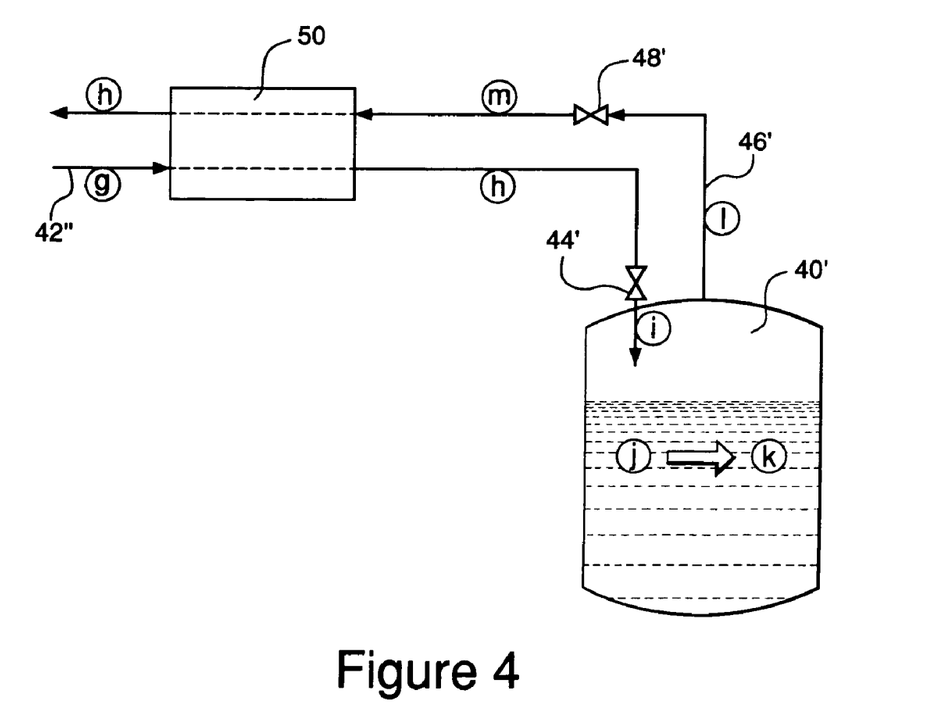
FIG. 4 provides an alternative embodiment of the generation and collection apparatus of FIG. 3 further including a heat exchanger device.
Figure 5:
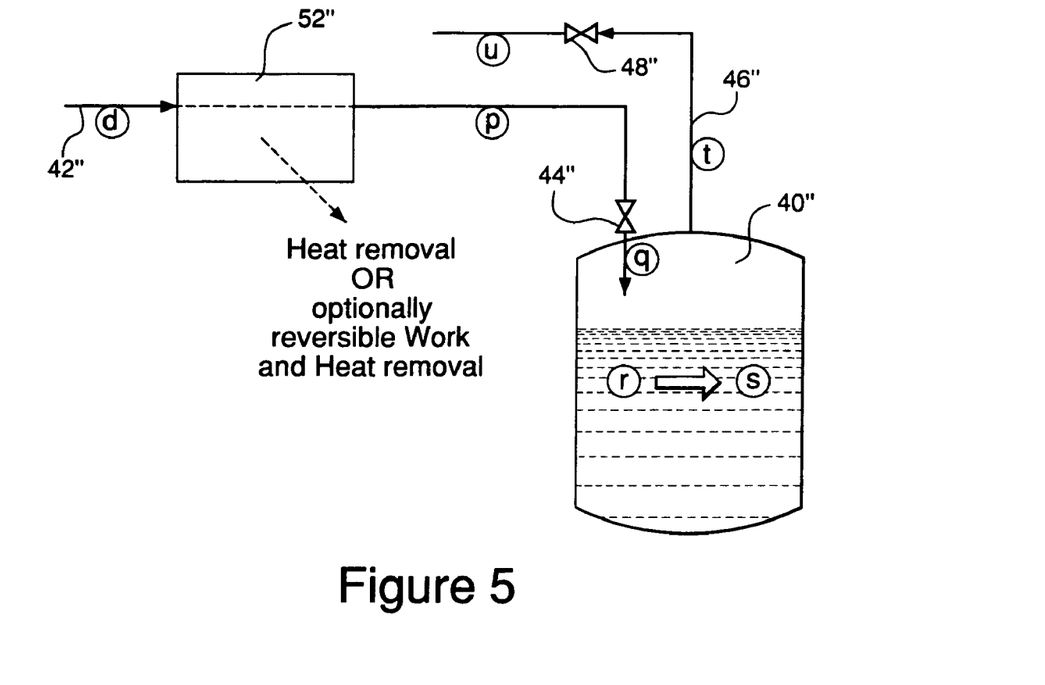
FIG. 5 provides an alternative embodiment of the generation and collection apparatus of FIG. 3 further including a reversible expander and heat exchanger device for a vapor feed stream.

FIGS. 3 through 5 provide illustrations of various embodiments of slush generation and/or collection apparatus such as vessels 8a, 8b, and 8c in FIGS. 1 and 2. FIGS. 4 and 5 are variations of the apparatus in FIG. 3 which further include a heat exchanger device and a reversible expander and heat exchanger device, respectively, which may be employed depending upon the nature of the feed stream. The apparatus depicted in FIGS. 3 through 5 may be used for the production and delivery of an UHP, high pressure fluid product of at least one component, such as carbon dioxide, hydrogen, argon, nitrogen, oxygen, helium, and mixtures thereof, or alternatively, for the production and collection of a UHP solid phase source or slush comprising at least one component. For purposes of illustration, FIGS. 3 through 5 will be described with regard to the generation and collection of carbon dioxide slush.

The apparatus in FIG. 3 consists of a vessel 40, which is used for the formation and collection of UHP slush of at least one component; an inlet pipe 42 and inlet nozzle 44 which is in fluid communication with and allows for the introduction of a feed stream and pressure expansion of the feed stream into vessel 40, an outlet pipe 46 and valve 48 which is in fluid communication with and allows for the withdrawal of an effluent vapor from vessel 40. Inlet nozzle 44 and outlet valve 48 may be used simultaneously and/or alternatively to regulate the pressure within vessel 40. For example, one or both of nozzle 44 and valve 48 may be opened, or at least partially opened, to allow for pressure reduction of the feed stream thereby resulting in generation of, for example, a solid phase source.

FIG. 4 provides a similar apparatus as that illustrated in FIG. 3 but further includes a heat exchanger device 50 wherein the enthalpy of the incoming feed stream is reduced prior to introduction into vessel 40. In certain embodiments, at least a portion of the effluent vapor that is vented from vessel 40, which is at a lower temperature, is used to cool at least a portion of the incoming feed stream through inlet pipe 42.

FIG. 5 provides the same apparatus as FIG. 3 but further includes a reversible expander and heat exchanger device 52 for a vapor-phase feed stream. In certain embodiments, reversible expander and heat exchanger device 52 may be used to remove heat from at least a portion of the vapor-phase feed stream and liquidity at least a portion of the feed stream prior to entering vessel 40.

Referring again to FIG. 3, feed stream "a" is a fluid stream comprising at least component. Feed stream "a" may be at a pressure that is above the triple point pressure of the at least one component (~75 psia if the at least one component comprises $CO_2$) and above the triple point temperature (~−70° F. if the at least one component comprises $CO_2$) prior to introduction into vessel 40. In embodiments wherein the at least one component comprises $CO_2$, the feed stream may comprise a subcooled-liquid $CO_2$, saturated-liquid $CO_2$, a combination of liquid and vapor $CO_2$, a saturated-vapor $CO_2$, a superheated-vapor $CO_2$, etc.

Feed stream "a" is fed to nozzle 44 through inlet pipe 42. At nozzle 44, the feed stream is expanded to create a lower-pressure feed stream "b" such that the expanded feed stream "b" may be at or below the melting point temperature of the at least one component and at least partially comprises a solid phase "c", that may also contain a liquid and/or vapor phase of the at least one component, as it enters vessel 40. In vessel 40, the solid phase portion of the feed stream "c" is largely retained, which is referred to herein as the solid phase source, whereas at least a portion of the vapor phase of the feed, or effluent vapor "e", contained within vessel 40 can be removed from vessel through an outlet pipe 46. All or some of the volatile impurities, contained in the initial feed stream "a", expanded feed stream "b", the contents "c" and/or "d" within vessel 40, exit vessel 40 through outlet pipe 46 thereby purifying the contents remaining in vessel 40.

In certain embodiments, solid phase source "c" may be converted to a fluid product such as a liquid phase product "d" upon application of heat at constant volume by one or more energy sources (not shown). The energy source may be proximal and/or contained within vessel 40 (not shown). In these embodiments, solid phase portion of expanded feed stream "b" along with any retained portion of liquid and/or vapor phase is collected as solid phase source "c" in vessel 40. Solid phase source "c", consisting substantially of the at least one component in solid phase, has a higher relative density as compared to inlet feed stream "a". As such, solid phase source "c" may be subsequently isochorically heated to produce high-pressure fluid phase product "d".

The pressures of the incoming feed stream "a", expanded feed stream "b" and contents of vessel 40, "c" and "d", are maintained and regulated by valve outlet 48, which imposes a controlled backpressure on the feed stream. In certain embodiments such as when incoming feed stream "a" comprises a liquid phase, the pressures of expanded stream "b", effluent vapor "e", and of the contents of vessel 40, "c" and/or "d", may be oscillated over time to levels above and below the triple point pressure of the at least one component to periodically create a liquid-vapor and solid-vapor of the at least one component contained within vessel 40 whilst still permitting removal of effluent vapor "e" from vessel 40. As a result of this oscillation, a slush is produced of the at least one component that assists in minimizing the amount of retained effluent vapor of the at least one component within vessel 40 and allows for the removal of most vapor and most volatile impurities from vessel 40 in effluent stream "e". Upon passing through valve 48, stream "e" may be further expanded to create a lower-pressure effluent vapor stream "f". Lower-pressure effluent vapor stream "f" may be vented, may be recovered for alternate use, may be liquefied and recovered to storage, and/or may be compressed and recycled to incoming feed stream "a". In the latter embodiments whereby lower-pressure effluent vapor stream "f" is recycled into incoming feed stream "a", stream "f" may be passed through at least one purifier, such as, but not limited to, a filter, a distiller, an adsorbent bed, a scrubber, or other device suitable for removing contaminants from the effluent vapor.

An alternative embodiment of the vessel for the generation and collection of a UHP solid phase source and/or slush is provided in FIG. 4 that further includes an initial cooling step for the incoming feed stream. Referring to FIG. 4, inlet feed stream "g" is a fluid stream comprising at least one component in any state such as a subcooled-liquid, a saturated-liquid, a combination of liquid and vapor, a saturated-vapor, superheated-vapor, etc. Incoming feed stream "g" is above triple point pressure and above the triple point temperature of the at least one component.

Prior to introducing feed "g" into vessel 40', feed stream "g" is fed to heat exchanger 50 in which it is cooled, condensed, or cooled and condensed, by heat exchange with a cooling medium. In certain embodiments, the cooling medium may be effluent vapor stream "m" as depicted in FIG. 4 or it may be an independent cooling medium provided for refrigeration. After heat removal, stream "h" exits heat exchanger 50. Stream "h" may be substantially in the liquid phase, may be at its saturation temperature of the at least one component, or may be at a lower temperature as a subcooled liquid.

Stream "h" is then fed through nozzle 44'. At nozzle 44', stream "h" is expanded to create lower-pressure stream "i" such that stream "i" is at or below the melting point temperature of the at least one component and partially consists of a solid phase combined with the liquid and/or vapor phase of the at least one component. Stream "i" enters vessel 40'. In vessel 40', the solid phase portion of stream "i" is largely retained to provide a solid phase source "j" whereas part or the entire vapor portion of stream "i" is removed from vessel 40' through outlet pipe 46' as effluent stream "l". The solid phase portion of stream "i" along with any retained portion of liquid and/or vapor phase is collected as solid phase source "j" in vessel 40'. Solid phase source "j" has a higher relative density as compared to inlet feed stream "g". As such, solid phase source "j" may be subsequently isochorically heated to produce a high-pressure fluid product such as liquid product stream "k". All or some of the volatile impurities, contained in streams "g", "h", "i", the contents "j" and/or "k" within vessel 40', exit vessel 40' in stream "l" thereby purifying the contents remaining in vessel 40'.

The pressures of streams "g", "h", "i", the contents "j" and/or "k" within vessel 40' are maintained and regulated by valve 48' which imposes a controlled backpressure. In certain embodiments, the pressures of streams "g", "h", "i", the contents "j" and/or "k" within vessel 40' may be oscillated over time to levels above and below the triple point pressure of the at least one component in order to periodically create a slush of at least one component whilst still permitting effluent vapor removal from vessel 40'. The periodic production of slush of the at least one component assists in minimizing the amount of retained effluent vapor in vessel 40' and allows for the removal of most vapor and most volatile impurities from vessel 40' in stream "l".

Upon passing through valve 48', stream "l" may be further expanded to create lower-pressure stream "m". Stream "m" is at a lower temperature than inlet feed stream "g". In one embodiment, stream "m" may be used to provide heat removal from stream "g" in heat exchanger 50 as depicted in FIG. 4. Upon recovery of useful refrigeration from stream "m", it exits heat exchanger 50 as stream "n". Stream "n" may be vented, recovered for alternate use, be liquefied and recovered to storage, or compressed and recycled to stream "n". In the latter embodiments, the recycle may include passing through at least one purifier (not shown).

Yet another alternative embodiment of the vessel for the generation and collection of a UHP solid and/or slush is provided in FIG. 5 that further includes an initial cooling and liquefaction step for the incoming feed stream which is in gaseous or vapor phase. Referring to FIG. 5, inlet feed stream "o" is a fluid stream comprising at least one component in vapor phase such as a saturated-vapor, a superheated-vapor $CO_2$, etc. Feed stream "o" is at a pressure above the triple point pressure and at a temperature above the triple point temperature. In embodiments wherein the at least one component comprises carbon dioxide, the pressure of feed stream "o" may range between about 250 psia and 1070 psia and the temperature of feed stream "o" is above about $-70°$ F. or may range from about $-1°$ F. to about $+88°$ F.

Feed stream "o" is fed to device 52. Device 52 may provide heat removal from stream "o", may provides both heat removal from stream "o" and produce reversible work from stream "o" by expansion, or alternatively may provide only reversible work from stream "o". Expansion is preferably performed nearly isentropically to maximize the enthalpy reduction in stream "o". Stream "p" exits device 52. Stream "p" is at or below the pressure of stream "o". Stream "p" is primarily or entirely in the liquid phase, may be at its saturation temperature, or may be at a lower temperature as a subcooled liquid. Stream "p" is fed to vessel 40" through nozzle 44". At nozzle 44", stream "p" is expanded to create lower-pressure stream "q" such that stream "q" is at or below the melting point temperature of the at least one component and partially consists of a solid phase combined with liquid and/or vapor phase of the at least one component. Stream "q" enters vessel 40".

In vessel 40", the solid phase portion of stream "q" is largely retained to provide a solid phase source "r" whereas part or the entire vapor portion of stream "q" is removed from vessel 40" through outlet pipe 46" as effluent stream "t". The solid phase portion of stream "q" along with any retained portion of liquid and/or vapor phase is collected as solid phase source "r" in vessel 40". Solid phase source "r" has a higher relative density as compared to inlet feed stream "o". As such, solid phase source "r" may be subsequently isochorically heated to produce a high-pressure fluid product stream "s". All or some of the volatile impurities, contained in streams "o", "p", "q", the contents "r" and/or "s" within vessel 40" exit vessel 40" in stream "t", hence purifying the contents remaining in vessel 40".

The pressures of streams "o", "p", "q", the contents "r" and/or "s" within vessel 40" are maintained and regulated by valve 48" which imposes a controlled backpressure. In certain embodiments, the pressures of streams "o", "p", "q", the contents "r" and/or "s" within vessel 40" may be oscillated over time to levels above and below the triple point pressure of the at least one component in order to periodically create a slush of at least one component whilst still permitting effluent vapor removal from vessel 40". The periodic production of a slush of the at least one component assists in minimizing the amount of retained effluent vapor in vessel 40" and allows for the removal of most vapor and most volatile impurities from vessel 40" in stream "t". Stream "f" may be vented, may be recovered for alternate use, may be liquefied and recovered to storage, or may be compressed and recycled to stream "o". In the latter embodiments, the recycle may optionally passing through at least one purifier (not shown).

It is preferable that all materials in contact with the feed stream, fluid product stream, solid phase source, and slush satisfy UHP product requirements. In this connection, all wetted parts should not react with the fluid product nor shed any impurities in various forms such as particles, metals, etc. In addition, it is desirable that the apparatus and some if not all system components withstand maximum design pressure, for example 10,000 psig.

Figure 6:
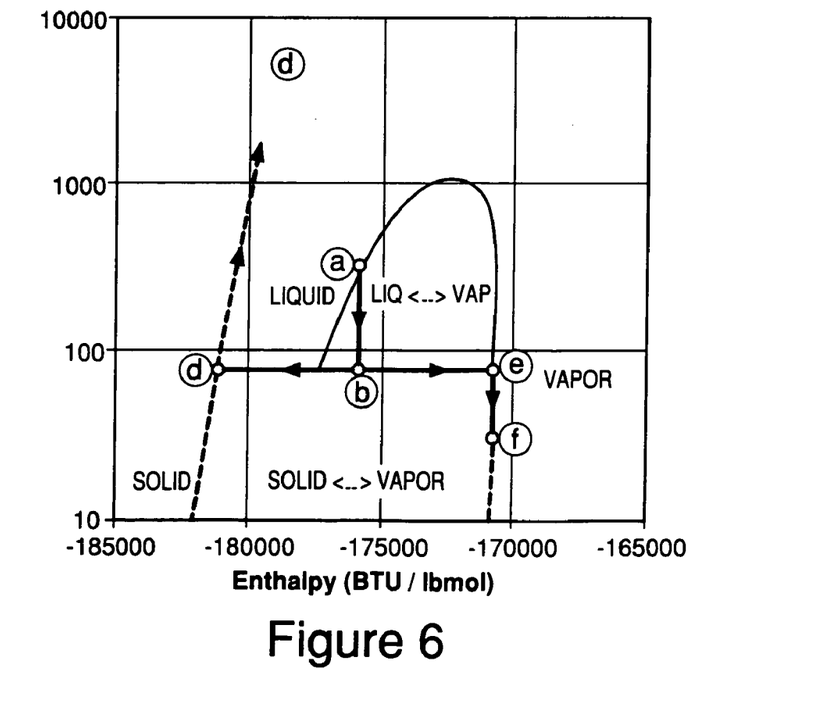
FIG. 6 is an exemplary pressure-enthalpy diagram based on available literature data that illustrates the expansion of saturated liquid $CO_2$ feed source to approximately the triple point pressure and temperature of $CO_2$ using the apparatus shown in FIG. 3.

FIG. 6 is an exemplary pressure-enthalpy diagram based on available literature data that illustrates the expansion of saturated liquid $CO_2$ feed source to approximately the triple point pressure and temperature of $CO_2$ using the apparatus shown in FIG. 3. Examples of available literature that contains the pressure-enthalpy data for $CO_2$ used in FIGS. 6 through 9 and Tables I through IV include the following which are incorporated herein by reference: R. Span et al., "A New Equation of State for Carbon Dioxide Covering the Fluid Region from the Triple-Point Temperature to 1100 K at Pressures up to 800 MPa", J. Phys. Chem. Ref. Data, Vol. 25, No. 6, 1996; N. B. Vargaftik, *Handbook of Physical Properties of Liquids and Gases*, 2nd Ed. (1983); L'Air Liquide, Gas Encyclopedia (1976).

Table I provides the standard stream process conditions for the exemplary $CO_2$ system. Referring to FIG. 3, inlet feed stream "a" may be a saturated liquid $CO_2$ at 315 psia and $2°$ F. It is expanded adiabatically through nozzle 44 into vessel 40 as multiphase stream "b" at 75 psia and $-70°$ F., which corresponds approximately to the triple point conditions of $CO_2$. Expanded feed stream "b" may be composed of solid, liquid and vapor phases. The portion of stream "b" remaining in vessel 40 is solid phase source "c". At just below the triple point pressure, solid phase source "c" is composed of both solid and vapor phases. When vessel 40 is isolated and isochorically heated, the solid phase source "c" converts to a fluid product such as a liquid phase product and attains a pressure of 5000 psia at $-58°$ F. A portion of the vapor component of expanded feed stream "b" is removed from vessel 40 through pipe 46 as effluent stream "e". The pressure of streams "a", "b", "e", and contents of vessel 40 or "c" and "d" may be regulated by valve 48. The pressure may be oscillated, for example, to just above and just below the triple point pressure of $CO_2$ such that the contents of vessel 40 phase shift between a liquid-vapor and solid-vapor as the effluent vapor is being withdrawn from the vessel. As a result, the formation of the slush collapses the vapor void fraction maximizing the vapor portion that may be removed as stream "e". Stream "f" then exits valve 48 at 30 psia.

TABLE I

| | Stream | | | | | |
|---|---|---|---|---|---|---|
| | "a" | "b" | "c" | "d" | "e" | "f" |
| Phase | Liquid | Multiphase | Multiphase | Multiphase | Vapor | Vapor |
| Press. (psia) | 315 | 75 | 75 | 5000 | 75 | 30 |
| Temp. (° F.) | 2 | −70 | −70 | −58 | −70 | −86 |
| Density (lb/ft$^3$) | 63.5 | 1.68 | 66.4 | 66.4 | 0.858 | 0.341 |

Figure 7:
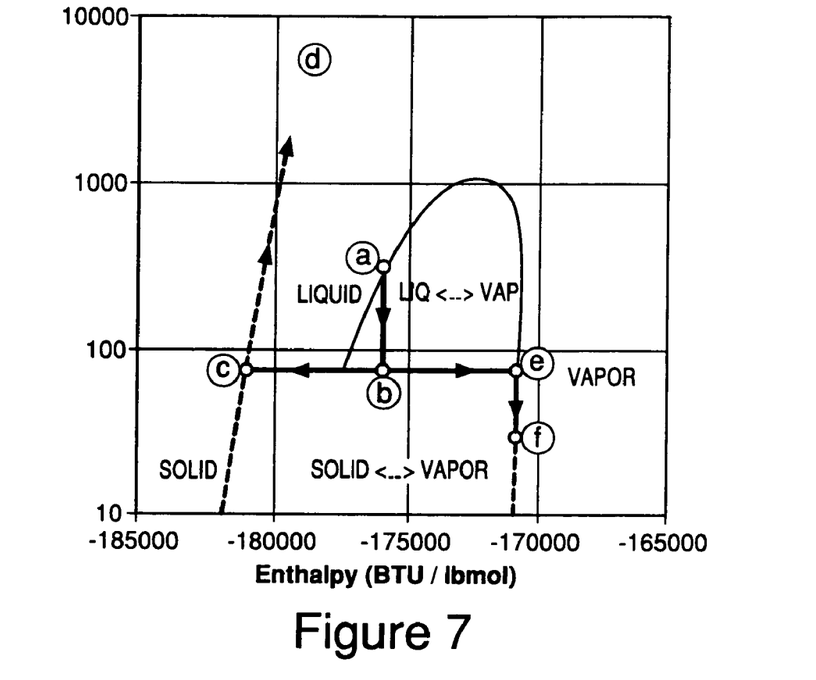
FIG. 7 is an exemplary pressure-enthalpy diagram based on available literature data that illustrates the expansion of saturated liquid $CO_2$ feed source to a temperature and pressure below the triple point conditions of $CO_2$ using the apparatus shown in FIG. 3.

FIG. 7 is an exemplary pressure-enthalpy diagram based on available literature data that illustrates the expansion of saturated liquid $CO_2$ feed source to a temperature and pressure below the triple point conditions of $CO_2$ using the apparatus shown in FIG. 3. Table II provides the standard stream process conditions for the exemplary $CO_2$ system depicted in FIG. 7.

TABLE II

| | Stream | | | | | |
|---|---|---|---|---|---|---|
| | "a" | "b" | "c" | "d" | "e" | "f" |
| Phase | Liquid | Multiphase | Multiphase | Multiphase | Vapor | Vapor |
| Press. (psia) | 315 | 50 | 50 | 5000 | 50 | 30 |
| Temp. (° F.) | 2 | −86 | −86 | −58 | −86 | −94 |
| Density (lb/ft$^3$) | 63.5 | 1.11 | 66.9 | 66.9 | 0.584 | 0.350 |

Figure 8:
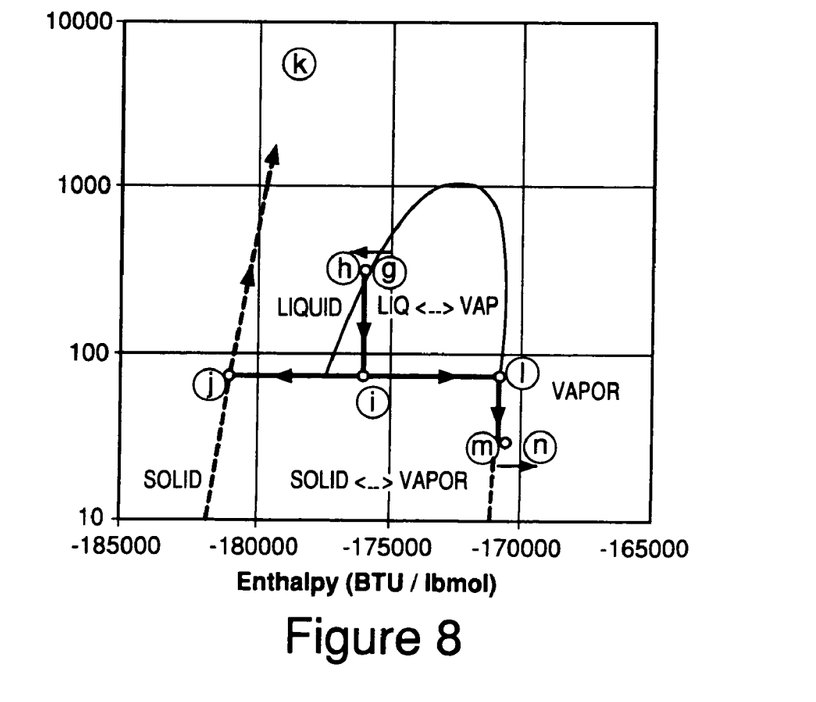
FIG. 8 is an exemplary pressure-enthalpy diagram based on available literature data that illustrates the expansion of a sub-cooled liquid phase $CO_2$ feed source to approximately the triple point pressure and temperature of $CO_2$ using the apparatus shown in FIG. 4.

FIG. 8 is an exemplary pressure-enthalpy diagram based on available literature data that illustrates the expansion of a sub-cooled liquid phase $CO_2$ feed source to approximately the triple point pressure and temperature of $CO_2$ using the apparatus shown in FIG. 4. Table III provides the standard stream process conditions for the exemplary $CO_2$ system depicted in FIG. 8.

Figure 9:
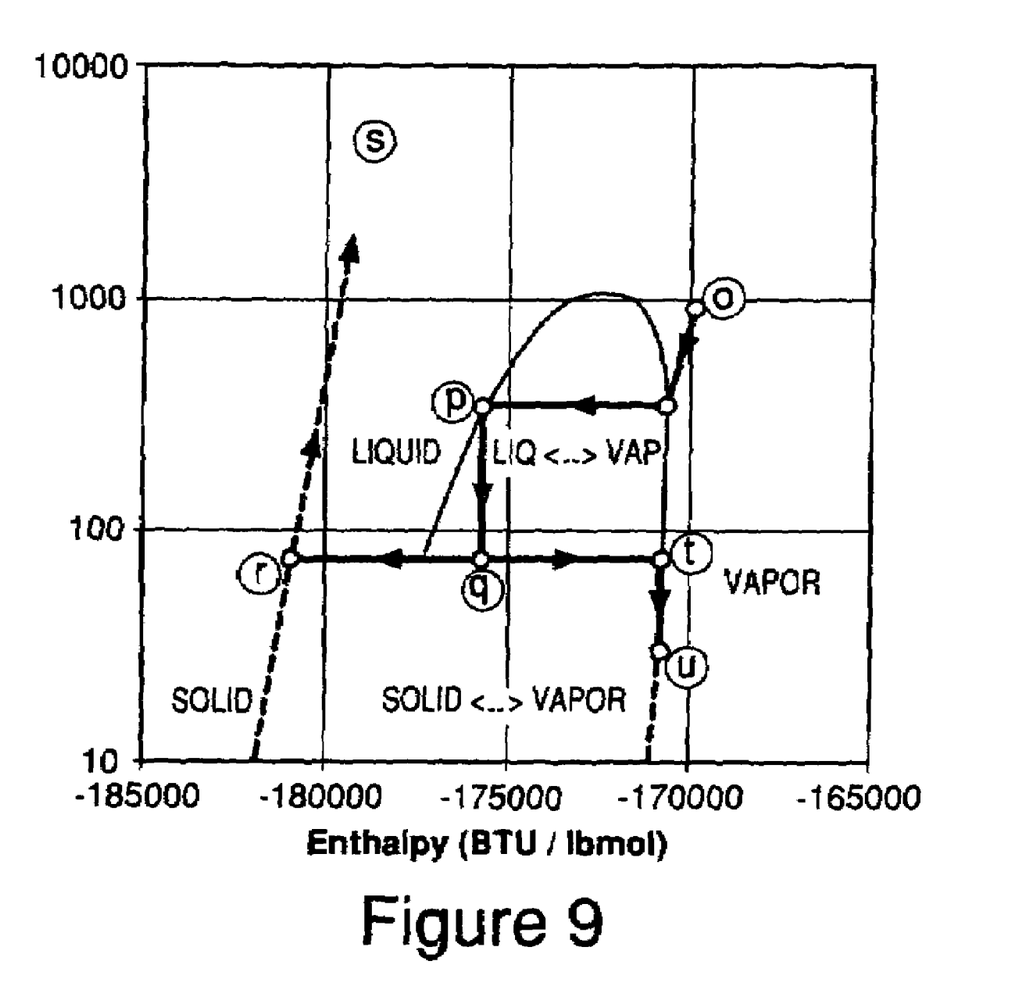
FIG. 9 is an exemplary pressure-enthalpy diagram based on available literature data that illustrates the cooling, condensation, and expansion of a super-heated vapor-phase $CO_2$ feed source to approximately the triple point pressure and temperature of $CO_2$ using the apparatus shown in FIG. 5.

FIG. 9 is an exemplary pressure-enthalpy diagram based on available literature data that illustrates the cooling, condensation, and expansion of a super-heated vapor-phase $CO_2$ feed source to approximately the triple point pressure and temperature of $CO_2$ using the apparatus shown in FIG. 5. Table IV provides the standard stream process conditions for the exemplary $CO_2$ system depicted in FIG. 9.

TABLE III

| | Stream | | | | | | | |
|---|---|---|---|---|---|---|---|---|
| | "g" | "h" | "i" | "j" | "k" | "l" | "m" | "n" |
| Phase | Liquid | Liquid | Multiphase | Multiphase | Multiphase | Vapor | Vapor | Vapor |
| Press. (psia) | 315 | 315 | 75 | 75 | 5000 | 75 | 30 | 30 |
| Temp. (° F.) | 2 | −4 | −70 | −70 | −58 | −70 | −86 | −53 |
| Density (lb/ft$^3$) | 63.5 | 64.5 | 1.72 | 66.4 | 66.4 | 0.858 | 0.341 | 0.310 |

TABLE IV

| | Stream | | | | | | |
|---|---|---|---|---|---|---|---|
| | "o" | "p" | "q" | "r" | "s" | "t" | "u" |
| Phase | Vapor | Liquid | Multiphase | Multiphase | Multiphase | Vapor | Vapor |
| Press. (psia) | 900 | 342 | 75 | 75 | 5000 | 75 | 30 |
| Temp. (° F.) | 134 | 7 | −70 | −70 | −58 | −70 | −86 |
| Density (lb/ft$^3$) | 8.39 | 62.7 | 1.64 | 66.4 | 66.4 | 0.858 | 0.341 |

The invention claimed is:

1. A process for producing a fluid product stream at a required pressure, the process comprising:
introducing a feed stream into a vessel wherein the feed stream comprises at least one component;
converting at least a portion of the feed stream in the vessel to a solid phase source;
converting at least a portion of the solid phase source in the vessel to a fluid product until a desired pressure is reached wherein the desired pressure is at or above the required pressure;
maintaining the desired pressure within the vessel; and
withdrawing the fluid product at the elevated pressure from the vessel.

2. The process of claim 1 further comprising removing at least a portion of an effluent vapor from the vessel while maintaining a controlled pressure within the vessel.

3. The process of claim 2 further comprising adding at least a portion of the effluent vapor into the feed stream.

4. The process of claim 3 wherein the effluent vapor is passed through at least one purifier prior to the adding step.

5. The process of claim 2 wherein the controlled pressure is below the triple point pressure of the at least one component.

6. The process of claim 2 wherein the controlled pressure is above the triple point pressure of the at least one component.

7. The process of claim 2 wherein at least a portion of the feed stream is converted into a liquid phase feed stream prior to the introducing step by passing at least a portion of the feed stream through a heat exchanger.

8. The process of claim 7 wherein at least a portion of the effluent vapor is passed through the heat exchanger wherein the temperature of the effluent vapor is lower than the temperature of the liquid phase feed stream prior to passing the effluent vapor and the liquid phase feed stream through the heat exchanger.

9. The process of claim 1 wherein at least a portion of the feed stream is passed through a reversible expander and/or heat exchanger device prior to the introducing step to decrease a temperature of the feed stream and convert at least a portion of the feed stream to the liquid phase feed stream.

10. The process of claim 1 wherein the required pressure of the fluid product stream ranges from 300 to 10,000 psig.

11. The process of claim 1 wherein the at least one component comprises carbon dioxide.

12. The process of claim 1 wherein the first converting step comprises reducing a pressure of the feed stream below the triple-point pressure.

13. The process of claim 1 wherein the first converting step comprises reducing a temperature of the feed stream contained within the vessel.

14. The process of claim 1 wherein the second converting step comprises applying an energy source to the solid phase source.

15. The process of claim 14 wherein energy source is at least one selected from the group consisting of thermal, microwave, radiation, ultrasonic, sonic, laser, and mixtures thereof.

16. A process for producing a solid phase source or a slush comprising at least one component and delivering a liquid therefrom, the process comprising the steps of:
introducing a feed stream into a vessel wherein the feed stream comprises at least one component and is at a first pressure that is above the triple point pressure of the at least one component;
reducing the pressure of the feed stream as it enters the vessel to a second pressure below the triple-point that is below the first pressure to effect a phase change such that the feed stream comprises a solid phase source and an effluent vapor phase upon entry into the vessel;
applying at least one energy source to at least a portion of the solid phase source in the vessel to convert at least a portion of the solid phase source to a liquid phase;
removing at least a portion of the effluent vapor within the vessel; and
withdrawing the liquid phase from the vessel.

17. The process of claim 16 further comprising adding at least a portion of the effluent vapor into the feed stream.

18. The process of claim 17 wherein the effluent vapor is passed through at least one purifier prior to the adding step.

19. The process of claim 16 wherein at least a portion of the feed stream is converted into a liquid phase feed stream prior to the introducing step by passing at least a portion of the feed stream through a heat exchanger.

20. A process for producing a solid phase source or a slush comprising at least one component, the process comprising:
introducing a feed stream into a vessel wherein the feed stream comprises at least one component and is at a first pressure that is above the triple point pressure of the at least one component;
reducing the pressure of the feed stream within the vessel to a second pressure that is below the first pressure wherein at least a portion of the feed stream in the vessel is converted to the solid phase source;
oscillating the pressure within the vessel to a pressure above and a pressure below the triple point pressure of the at least one component to generate the solid phase source or the slush; and
removing at least a portion of an effluent vapor within the vessel.

21. The process of claim 20 further comprising adding at least a portion of the effluent vapor into the feed stream.

22. The process of claim 21 wherein the effluent vapor is passed through at least one purifier prior to the adding step.

23. The process of claim 20 further comprising applying at least one energy source to convert at least a portion of the solid phase source contained therein to a liquid phase.

24. The process of claim 20 wherein at least a portion of the feed stream is converted into a liquid phase feed stream prior to the introducing step by passing at least a portion of the feed stream through a heat exchanger.

25. An apparatus for producing a fluid product stream at a required pressure comprising:
a vessel for receiving a feed stream comprising at least one component;
a chiller capable of converting at least a portion of the feed stream to the solid phase source in the vessel;
a heater capable of converting a solid phase source contained within the vessel to the fluid product stream; and
a flow network in fluid communication with the vessel that allows for charging of the feed stream and for discharging the fluid product stream there from wherein the flow network regulates the pressure contained within the vessel to one or more pressures at or above the required pressure.

26. An apparatus for producing a fluid product stream at a required pressure comprising: a vessel for receiving a feed stream comprising at least one component wherein the feed stream is at a first pressure; a nozzle that is in fluid communication with the vessel wherein the pressure of the feed stream is reduced as it enters the vessel to a second pressure that is below the first pressure to effect a phase change such that the feed stream comprises a solid phase source and an effluent vapor phase upon entry into the vessel; at least one energy source that converts the solid phase source contained within the vessel to the fluid product stream; and a flow network in fluid communication with the vessel that allows for charging of the feed stream and for discharging of the effluent vapor from the vessel there from wherein the flow network regulates the pressure contained within the vessel to one or more pressures at or above the required pressure; a recycle flow network wherein the effluent vapor is reintroduced into the vessel and wherein the recycle flow network comprises at least one purifier wherein the effluent vapor is passed through the at least one purifier prior to reintroduction into the vessel.

27. The apparatus of claim 26 further comprising a heat exchanger wherein at least a portion of the effluent vapor is passed therethrough.

28. The apparatus of claim 27 wherein at least a portion of the feed stream is passed through the heat exchanger.

29. The apparatus of claim 26 further comprising a heat exchanger wherein at least a portion of the feed stream is passed therethrough.

30. The apparatus of claim 26 further comprising a reversible expander and/or heat exchanger wherein at least a portion of the feed stream is passed through the reversible expander and/or heat exchanger to decrease the temperature of the at least a portion of the feed stream.

31. An apparatus for producing a solid phase source or a slush comprising at least one component, the apparatus comprising: an inlet pipe for introducing a feed stream comprising at least one component wherein the feed stream is at a first pressure; an expansion nozzle that is in fluid communication with the inlet pipe wherein the pressure of the feed stream is reduced to a second pressure that is below the first pressure to convert at least a portion of the feed stream to provide the solid phase source and an effluent vapor; a vessel that is in fluid communication with the expansion nozzle having at least one selected from the solid phase source, the feed stream, the slush, a fluid product, the effluent vapor, and mixtures thereof contained therein; at least one energy source proximal to and/or contained within the vessel wherein the at least one energy source converts at least a portion of the solid phase source to produce the slush; an outlet pipe in fluid communication with the vessel for the removal of at least a portion of the effluent vapor while maintaining a controlled pressure within the vessel; and a pressure control valve in fluid communication with the outlet pipe; wherein the liquid chase withdrawn from the vessel is at an elevated pressure.

32. The method of claim 16 wherein the withdrawn liquid phase is converted to a supercritical fluid.

* * * * *